US011922242B2

(12) United States Patent
Ito et al.

(10) Patent No.: US 11,922,242 B2
(45) Date of Patent: Mar. 5, 2024

(54) IMAGE FORMING APPARATUS, IMAGE FORMING METHOD, AND STORAGE MEDIUM

(71) Applicant: CANON KABUSHIKI KAISHA, Tokyo (JP)

(72) Inventors: Morikazu Ito, Tokyo (JP); Takahiro Soma, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 310 days.

(21) Appl. No.: 17/539,494

(22) Filed: Dec. 1, 2021

(65) Prior Publication Data

US 2022/0215212 A1    Jul. 7, 2022

(30) Foreign Application Priority Data

Jan. 4, 2021 (JP) .................................. 2021-000189

(51) Int. Cl.
*G06F 3/12* (2006.01)
*G06K 15/02* (2006.01)
*G06T 11/20* (2006.01)

(52) U.S. Cl.
CPC ........... *G06K 15/1849* (2013.01); *G06F 3/12* (2013.01); *G06K 15/1852* (2013.01); *G06T 11/20* (2013.01)

(58) Field of Classification Search
None
See application file for complete search history.

(56) References Cited

U.S. PATENT DOCUMENTS

2010/0315431 A1* 12/2010 Smith .................... G06T 11/20
345/619

FOREIGN PATENT DOCUMENTS

JP            2017081025 A       5/2017

* cited by examiner

*Primary Examiner* — Dov Popovici
(74) *Attorney, Agent, or Firm* — ROSSI, KIMMS & McDOWELL LLP

(57) ABSTRACT

An object of the present disclosure is to provide a mechanism capable of performing thickening processing of an object irrespective of the color of a line even in a case where the black over print is valid. One embodiment of the present invention is an image forming apparatus comprising a control unit configured to control whether or not to perform thickening processing to thicken an object in an upper layer and an object in a lower layer based on a raster operation code designating drawing processing in a case where the object in the upper layer and the object in the lower layer overlap, wherein the control unit: does not perform the thickening processing in a case where a value of the raster operation code is MERGEPEN and a color of the object in the upper layer is not a black color.

15 Claims, 10 Drawing Sheets

401 OVERLAP DETERMINATION ALGORITHM

| Number | Name | Computing | Computing (color of screen: Dest, color of drawing: Src) |
|---|---|---|---|
| 0 | BLACK | 0 | Pixel is always 0 |
| 1 | NOTMERGEPEN | DSon | Pixel is color obtained by inverting color of R2_MERGEPEN. Final pixel = NOT (screen pixel OR color of drawing) |
| 2 | MASKNOTPEN | DSna | Combination of colors common to both color of screen and color obtained by inverting color of drawing. Final pixel = screen pixel AND (NOT color of drawing) |
| 3 | NOTCOPYPEN | Sn | Pixel is color obtained by inverting color of drawing |
| 4 | MASKPENNOT | SDna | Pixel is combination of colors common to both color of drawing and color obtained by inverting color of screen. Final pixel = (NOT screen pixel) AND color of drawing |
| 5 | NOT | Dn | Pixel is color obtained by inverting color of screen |
| 6 | XORPEN | DSx | Pixel is color excluding colors common to both in combination of color of drawing and color of screen. Final pixel = screen pixel XOR color of drawing |
| 7 | NOTMASKPEN | DSan | Pixel is color obtained by inverting color of R2_MASKPEN. Final pixel = NOT (screen pixel AND color of drawing) |
| 8 | MASKPEN | DSa | Pixel is combination of colors common to both color of drawing and color of screen. Final pixel = screen pixel AND color of drawing |
| 9 | NOTXORPEN | DSxn | Pixel is color obtained by inverting color of R2_XORPEN. Final pixel = NOT (screen pixel XOR color of drawing) |
| A | NOP | D | Pixel is not changed |
| B | MERGENOTPEN | DSno | Pixel is combination of color of screen and color obtained by inverting color of drawing. Final pixel = screen pixel OR (NOT color of drawing) |
| C | COPYPEN | S | Pixel is the same color as that used for drawing |
| D | MERGEPENNOT | SDno | Pixel is combination of color of drawing and color obtained by inverting color of screen. Final pixel = (NOT screen pixel) OR color of drawing |
| E | MERGEPEN | DSo | Pixel is combination of color of drawing and color of screen. Final pixel = screen pixel OR color of drawing |
| F | WHITE | 1 | Pixel is always 1 |

402 bit COMPUTING OF COPYPEN AND MERGEPEN IN OVERLAP DETERMINATION ALGORITHM

| Src | Dst | COPYPEN | MERGEPEN |
|---|---|---|---|
| 0 | 0 | 0 | 0 |
| 0 | 1 | 0 | 1 |
| 1 | 0 | 1 | 1 |
| 1 | 1 | 1 | 1 |

FIG.4

IMAGE FORMING APPARATUS, IMAGE FORMING METHOD, AND STORAGE MEDIUM

BACKGROUND OF THE INVENTION

Field of the Invention

The present disclosure relates to image processing for PDL data, specifically, relates to ROP processing and thin line correction (thickening) processing.

Description of the Related Art

As the function for representing uniform the line width different depending on the engine, the PDL type and the like for a graphics object of the line attribute, there is a thin line thickening function to thicken a thin line. Further, there is drawing processing of a graphics object, which is performed by using an overlap determination algorithm, such as COPYPEN and MERGEPEN.

In a case where thin line thickening processing is performed in accordance with the COPYPEN algorithm, there arises no problem in drawing because overwriting is performed with the color of a graphics object in the upper layer. However, in a case where the thin line thickening processing is performed in accordance with the MERGEPEN algorithm, there is a case where incorrect drawing occurs. For example, in a case where the color of the graphics object in the upper layer is blue and the color of the graphics object in the lower layer is red, the colors of the adjacent objects mix with each other due to the thickening processing, and therefore, there occurs a phenomenon in which the contour of the object is seen as a line. In order to prevent this phenomenon, it is necessary to prevent the thin line thickening processing from being performed.

Japanese Patent Laid-Open No. 2017-081025 discloses a technique for making the width of a print-output thin line visually uniform irrespective of the thin line consisting of a single color or the thin line consisting of a mixed color.

SUMMARY OF THE INVENTION

In the drawing of black over print in which the MERGEPEN algorithm is adopted, for the reason described in Description of the Related Art, there is such a problem that the black thin line thickening processing is not valid. That is, the thickening processing is performed or not performed depending on the colors (black and colors other than black) of a line In Japanese Patent Laid-Open No. 2017-081025, whether the pixel constituting the thin line is a single color pixel or a mixed color pixel is determined and the width of the thin line is made visually uniform by correcting the amount by which the thin line is thickened in accordance with the determination. However, Japanese Patent Laid-Open No. 2017-081025 does not refer to the thin line thickening control in accordance with the color of an object and the determination algorithm. Consequently, in Japanese Patent Laid-Open No. 2017-081025, in a case where the thin line thickening processing is performed with the setting that the black over print is valid, the black thin line thickening processing is not performed because the MERGEPEN algorithm is observed.

Consequently, in view of the above-described problem, one embodiment of the present invention aims at providing a mechanism capable of performing the thickening processing of an object irrespective of the color of the line even in a case where the black over print is valid.

One embodiment of the present invention is an image forming apparatus including: a control unit configured to control whether or not to perform thickening processing to thicken an object in an upper layer and an object in a lower layer in image data included in a print job based on a raster operation code designating drawing processing in a case where the object in the upper layer and the object in the lower layer overlap, wherein the control unit: does not perform the thickening processing in a case where a value of the raster operation code is MERGEPEN and a color of the object in the upper layer is not a black color; and performs the thickening processing in a case where the value is MERGEPEN, the color of the object in the upper layer is a black color, and a pure black function is applied to the black color.

Further features of the present invention will become apparent from the following description of exemplary embodiments with reference to the attached drawings.

BRIEF DESCRIPTION OF THE DRAWINGS

FIG. 4 is a diagram showing an example of an overlap determination algorithm;

DESCRIPTION OF THE EMBODIMENTS

In the following, the best aspects for implementing the contents of the present disclosure are explained by using the drawings.

First Embodiment

<Configuration of Printing System>

Figure 1:
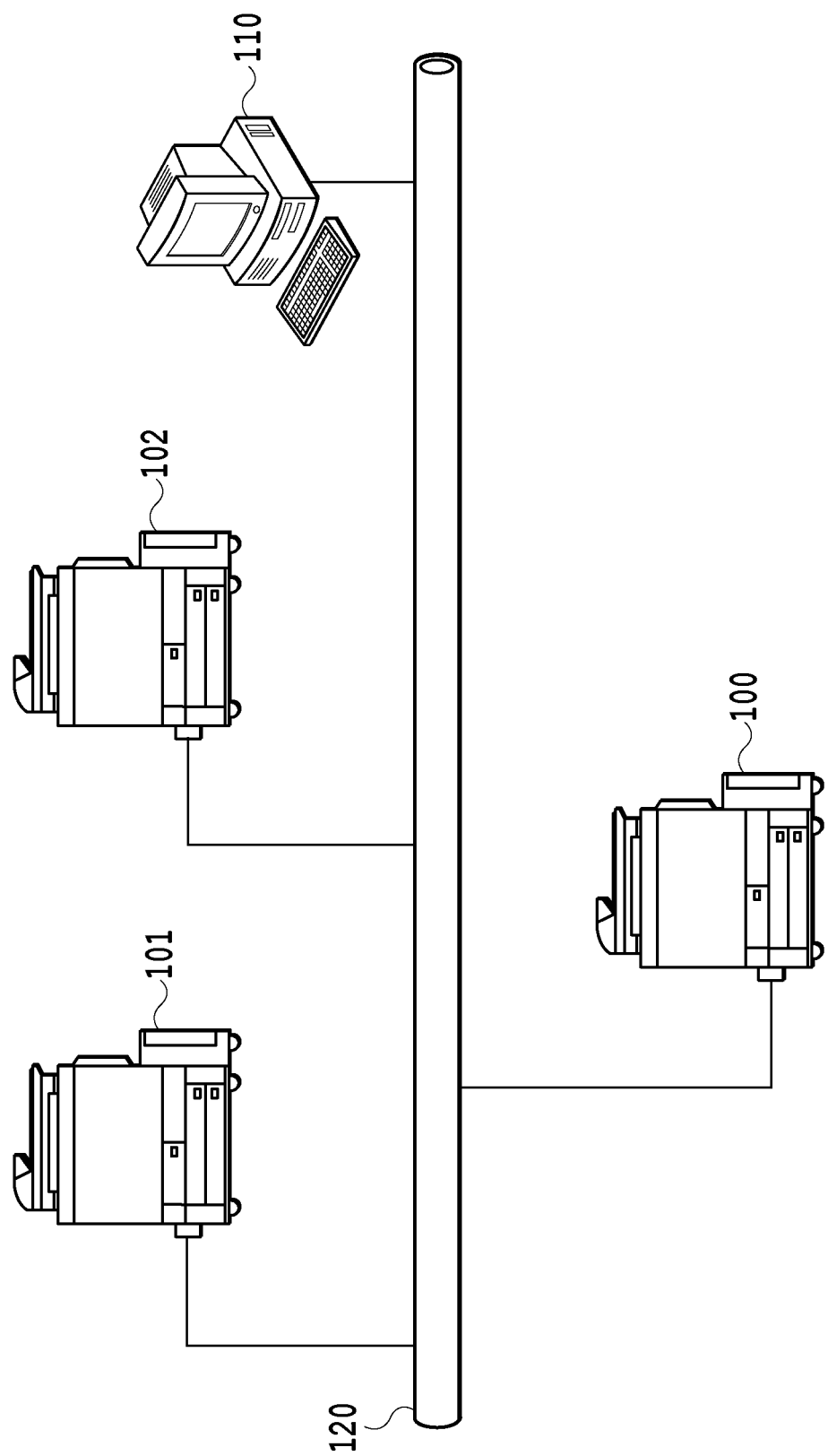
FIG. 1 is a diagram showing a configuration of a printing system.

In the following, the configuration of a printing system is explained using FIG. 1. Each of image forming apparatuses 100 to 102 is connected to a network 120 and capable of communicating with an external device including a PC 110 via the network 120. The PC 110 transmits print data, specifically, a print job to the image forming apparatuses 100 to 102 via the network 120. A general print job includes image data and printing setting information.

The image forming apparatuses 100 to 102 having received a print job perform printing processing based on the received print job. In the following explanation, for simplification, explanation relating to the image forming apparatus is given by using the image forming apparatus 100. The above is the contents relating to the configuration of the printing system.

<Configuration of Image Forming Apparatus>

Figure 2:
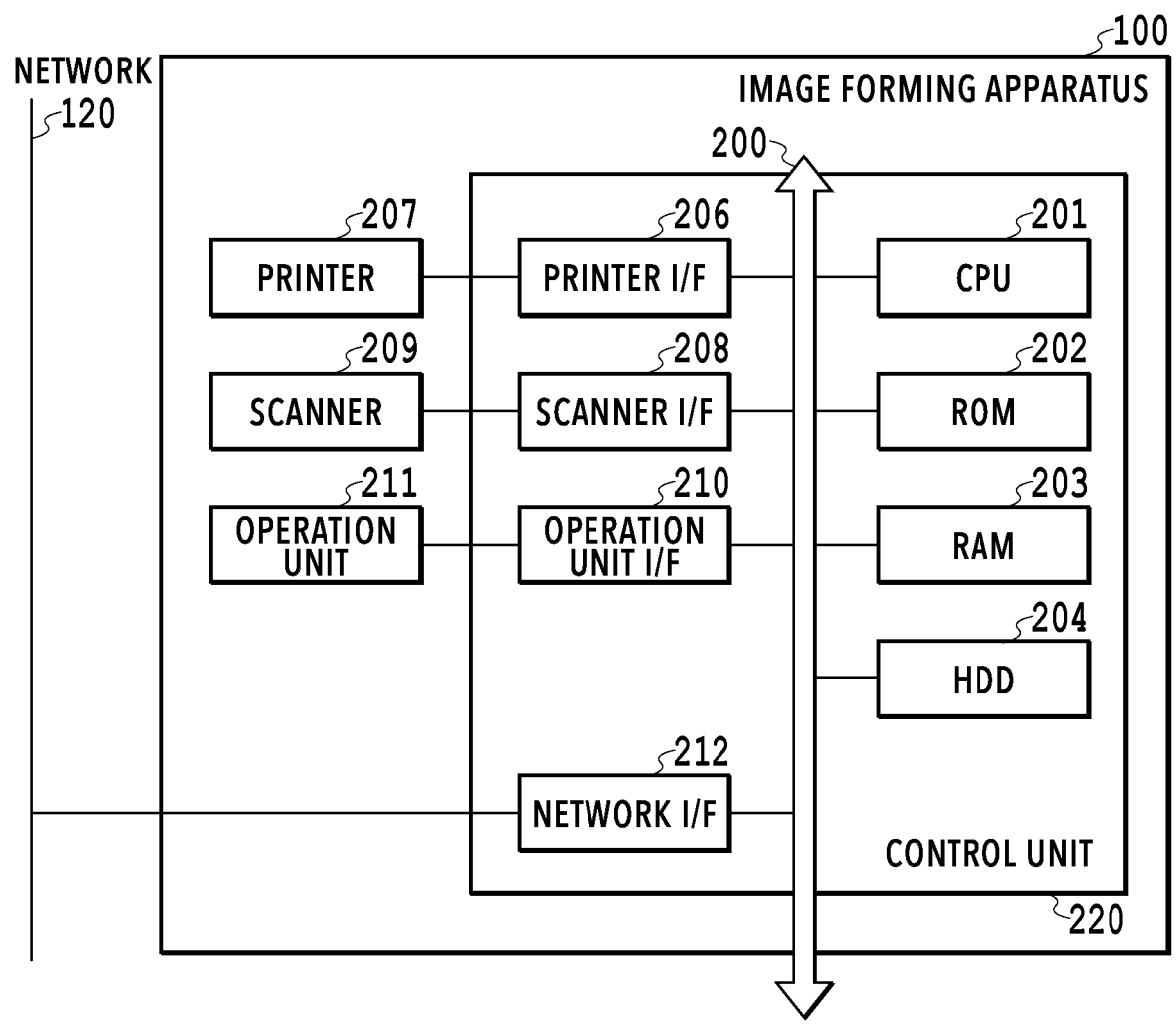
FIG. 2 is a block diagram showing a configuration of an image forming apparatus.

In the following, by using FIG. 2, the configuration of the image forming apparatus 100 is explained. As the image forming apparatus 100 of the present embodiment, a multifunction peripheral is supposed, but the image forming apparatus 100 may be a printer not having the function as a scanner.

A CPU 201 performs various kinds of processing for controlling the operation of the image forming apparatus 100 by loading control programs stored in a ROM 202 onto a RAM 203 and executing the loaded control programs. The CPU 201 is connected with other units within the image forming apparatus 100 by a bus 200. In the ROM 202, the control programs are stored. The RAM 203 is used as a temporary storage area, such as a main memory and a work area, of the CPU 201. In an HDD 204, various kinds of data, such as a print job received from an external device and image data obtained by scan processing (called scanned image) by a scanner 209, to be described later.

Here, the aspect is such that the image forming apparatus 100 has the one CPU 201 and the CPU 201 performs each piece of processing shown in a flowchart, to be described later, but another aspect may be accepted. For example, it is also possible to configure the image forming apparatus 100 so that a plurality of CPUs performs each piece of processing shown in a flowchart, to be described later, in cooperation with one another.

A printer I/F 206 connects a printer 207 and the bus 200. The printer 207 performs printing processing based on a print job received from an external device of the image forming apparatus 100, a scanned image created by the scanner 209 or the like.

A scanner I/F 208 connects the scanner 209 and the bus 200. The scanner 209 reads a document and creates a scanned image. The scanned image created by the scanner 209 is printed by the printer 207, stored in the HDD 204, and so on.

An operation unit I/F 210 connects an operation unit 211 and the bus 200. The operation unit 211 comprises a liquid crystal display unit having a touch panel function and a keyboard and displays various operation screens as a graphical user interface. It is possible for a user to input instructions and information to the image forming apparatus 100 via the operation unit 211.

A network I/F 212 connects to the network 120 and performs communication with an external device on the network. The network I/F 212 receives a print job transmitted from an external device and printing processing based on image data included in the received print job is performed by the printer 207.

The bus 200, the CPU 201, the ROM 202, the RAM 203, the HDD 204, the printer I/F 206, the scanner I/F 208, the operation unit I/F 210, and the network I/F 212 are together called a control unit 220. The above is the contents relating to the configuration of the image forming apparatus.

<Thin Line Thickening Processing>

Figure 3:
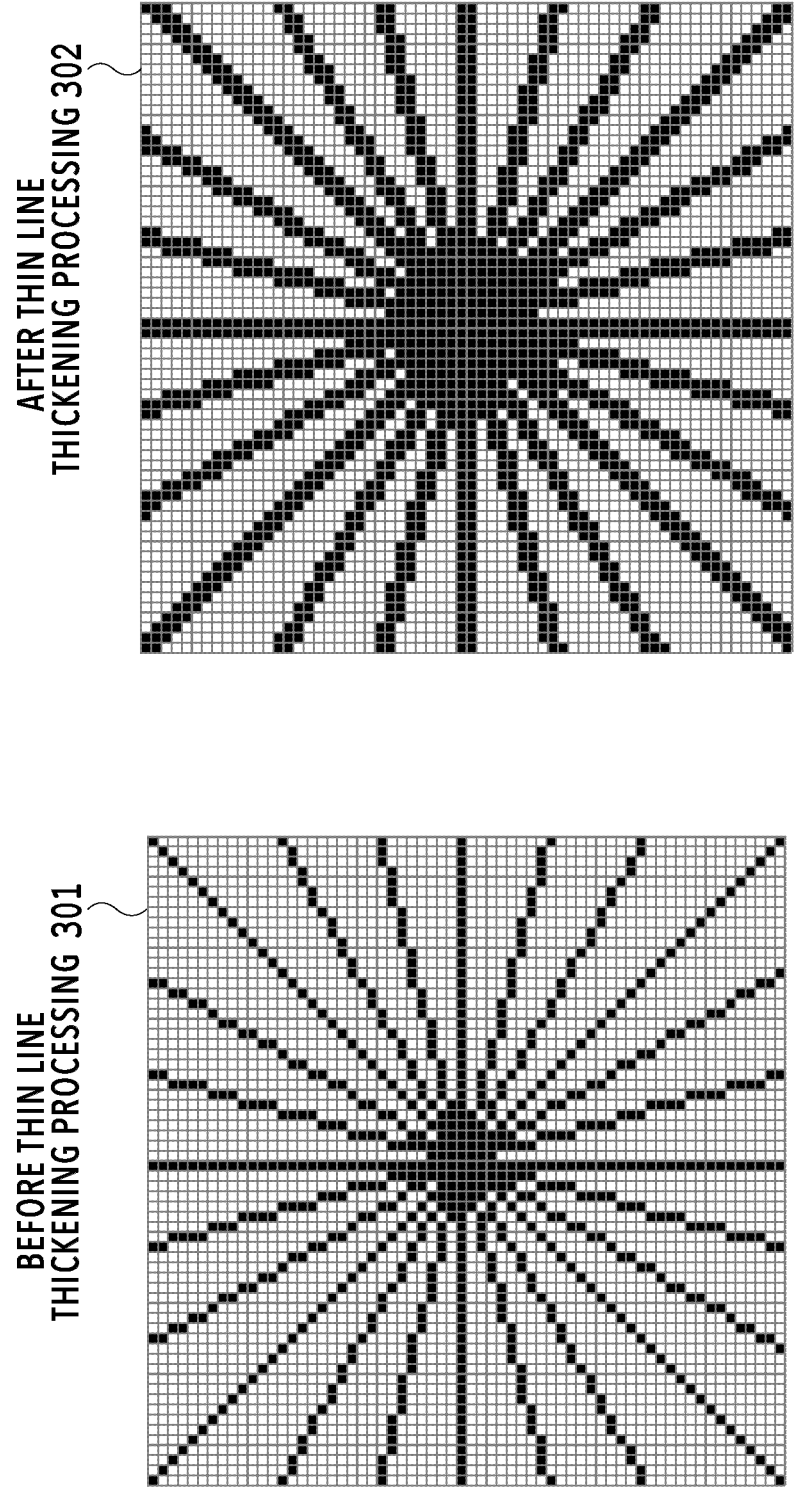
FIG. 3 is a diagram showing an example of thin line thickening processing.

In the following, by using FIG. 3, an example of thin line thickening processing is explained.

Thickening processing for thickening an object, such as a thin line, is performed by the CPU 201 of the image forming apparatus 100. An image 301 is an image before thin line thickening processing and in a case where the thickening processing is performed for the thin lines within the image 301, the state is brought about where the thin lines are thickened as shown in an image 302. The above is the contents relating to the thin line thickening processing.

<Overlap Determination Algorithm>

In the following, by using FIG. 4, an example of an overlap determination algorithm is explained.

The CPU 201 of the image forming apparatus 100 performs drawing processing in accordance with a command (specifically, ROP) of the overlap determination algorithm designated in the PDL data included in the print job created by a printer driver. As ROP, there are ROP 2 to ROP 4 in accordance with the kind of operand that is computed and a table 401 storing the overlap determination algorithm in FIG. 4 displays all patterns of the overlap determination algorithm called ROP 2. Further, a table 402 storing bit computing results indicates each computing pattern relating to COPYPEN and MERGEPEN described particularly in the following explanation of these patterns and Src within the table indicates the color of the foreground and Dst indicates the color of the background. For example, COPYPEN is designation to perform drawing in the color of the foreground without exception irrespective of the color of the background (that is, overwritten in the color of the foreground). Further, for example, MERGEPEN is designation to perform drawing in the color obtained as a result of the OR computing of the color of the background and the color of the foreground.

In processing called black over print, which is processing for preventing out of register, at the time of drawing black on the foreground in an overlapping manner by leaving the color of the background, MERGEPEN is used in the ROP computing. The above is the contents relating to the overlap determination algorithm.

<Case where Unintended Line is seen by Thin Line Thickening Processing>

Figure 5:
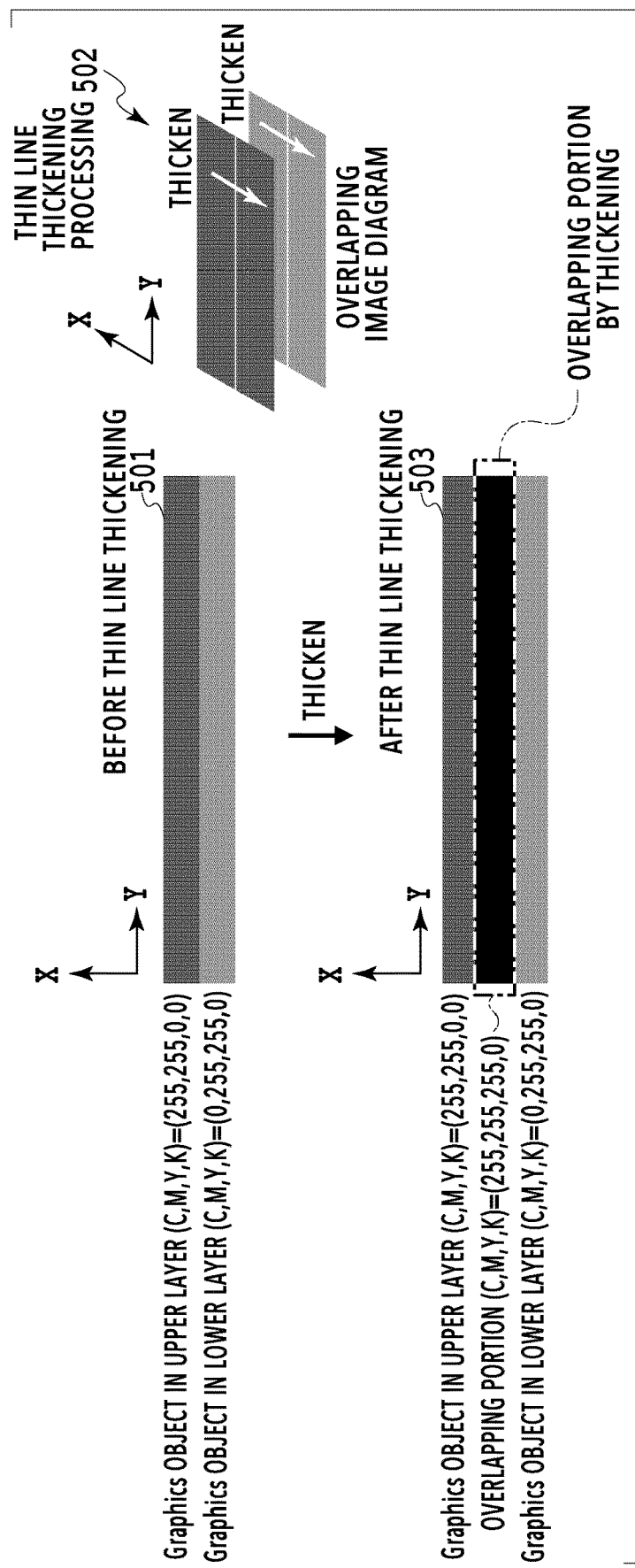
FIG. 5 is a diagram showing an example of thin line thickening processing.

In the following, an example of thin line thickening processing by which an unintended line is seen is explained by using FIG. 5.

The thin line thickening processing is performed by the CPU 201 of the image forming apparatus 100. The CPU 201 performs the thin line thickening processing in accordance with the setting from the setting menu or the driver of the image forming apparatus 100 or the control command included in the print job created by the printer driver.

Symbol 501 indicates an example in which a blue line whose width in the longitudinal direction (X-direction) is one pixel and which is in the upper layer and a red line whose width is one pixel and which is in the lower layer extend respectively along the horizontal direction (Y-direction) and the blue line and the red line are arranged one on top of another in the longitudinal direction (X-direction).

In a case where the thin line in the upper layer and the thin line in the lower layer, which are indicated by symbol 501, are thickened in the downward direction (-X-direction) by one pixel each as indicated by symbol 502 by the thin line thickening processing, as indicated by symbol 503, an overlap occurs at the thickened portion of the thickened blue line and the portion of the original red line. The color of the overlap portion is determined in accordance with ROP designated by the print job as explained by using FIG. 4.

Here, a case is shown where the code value of the raster operation code is MERGEPEN and at the overlap portion, the color becomes a black color ((C, M, Y, K)=(255, 255, 255, 0)) different from the blue color of the upper layer and the red color of the lower layer, and therefore, the contour is seen as a line. In the present specification, it is assumed that each color of RGB and CMYK is designated by a value between 0 (0%) and 255 (100%). Further, the raster operation code is abbreviated to ROP code.

Consequently, in the case such as this, it is necessary to prevent the thin line from being thickened so that the contour is not seen as a line. In a case where the code value of the ROP code is COPYPEN, overwriting is performed with the color of the upper layer, and therefore, the phenomenon in which the contour is seen as a line does not occur. The above is the contents relating to the thin line thickening processing by which an unintended line is seen.

<Thin Line Thickening Processing in a Case where Black over Print is Valid>

Figure 6:
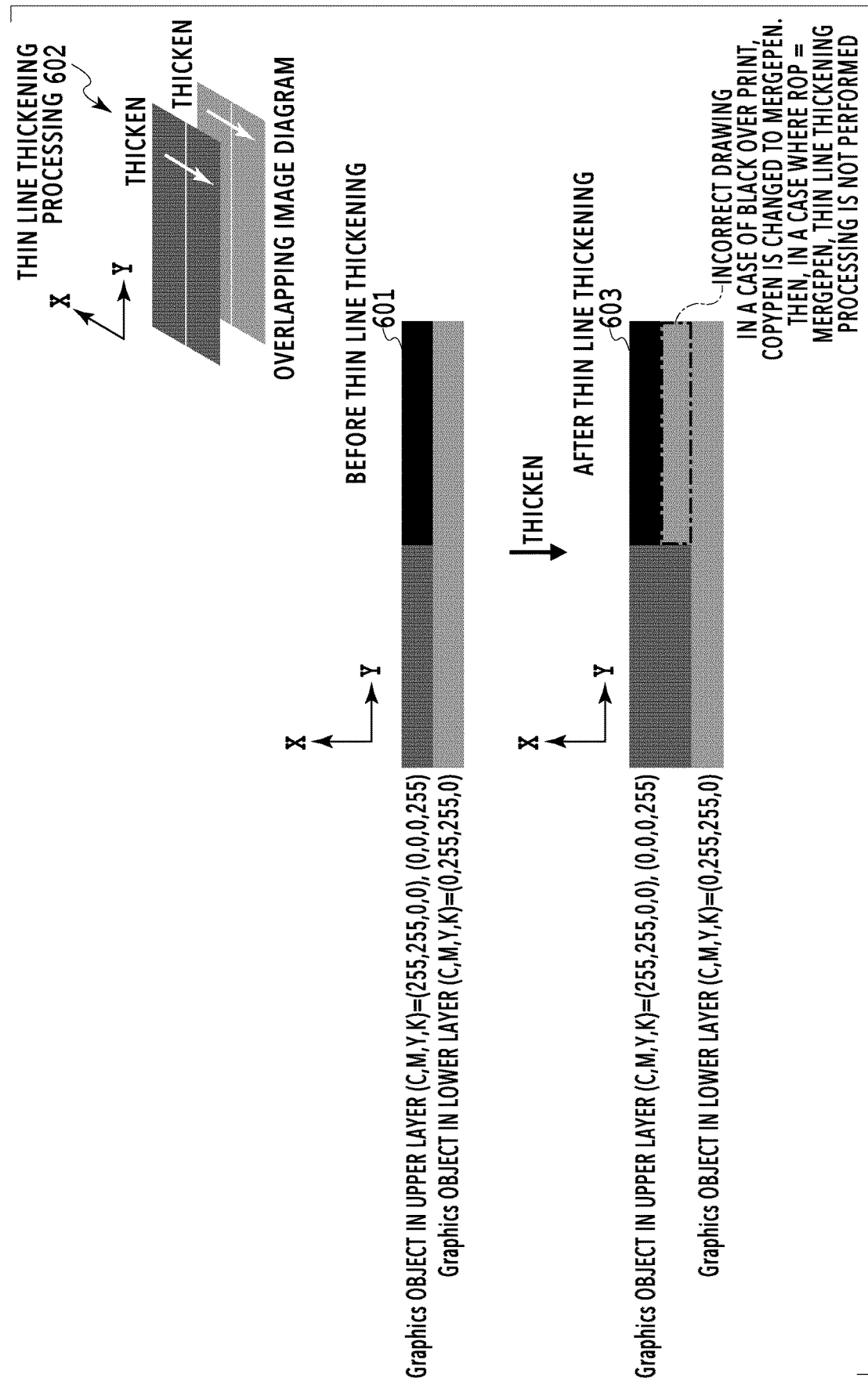
FIG. 6 is a diagram showing a conventional example of thin line thickening processing in a case where black over print is valid.

In the following, by using FIG. 6, a conventional example of the thin line thickening processing in a case where the black over print is valid is explained.

Symbol 601 indicates an example in which a blue line whose width in the longitudinal direction (X-direction) is one pixel and which is in the upper layer, a black line whose width is one pixel and which is in the upper layer, and a red line whose width is one pixel and which is in the lower layer extend respectively along the horizontal direction (Y-direction). In this example, the block line extends being continuous with the blue line extending along the horizontal direction (Y-direction) and the blue line and the black line continuous in the Y-direction and the red line are arranged one on top of another in the longitudinal direction (X-direction).

In a case where the thin lines in the upper layer and the thin line in the lower line, which are indicated by symbol 601, are thickened by one pixel each in the downward direction (−X-direction) as indicated by symbol 602 by the thin line thickening processing, as indicated by symbol 603, an overlap occurs at the thickened portion of the thickened blue line and the portion of the original red line. At this time, the thin line thickening processing is not performed for the portion of the black line.

The reason the thin line thickening processing is not performed for the black line is that in a case where the black over print is valid, the black line in the upper layer is the target of the black over print and the code value of the ROP code is changed from COPYPEN to MERGEPEN. As a result of this, in order to prevent the occurrence of incorrect drawing (see FIG. 5) by which the contour is seen as a line, which is described above, the thin line thickening processing is not performed.

On the other hand, the blue line in the upper layer is not the target of the black over print, and therefore, the code value of the ROP code is not changed and remains COPYPEN, and therefore, the thickening processing is performed. Consequently, as indicated by symbol 603, incorrect drawing occurs that the thickening processing is performed or not performed depending on the color of the thin line, and this brings about a problem. The above is the contents relating to the thin line thickening processing in a case where the black over print is valid.

<Thin Line Thickening Processing in a Case where Black Over Print is Valid and Pure Black Function has been applied to Black Color>

Figure 7:
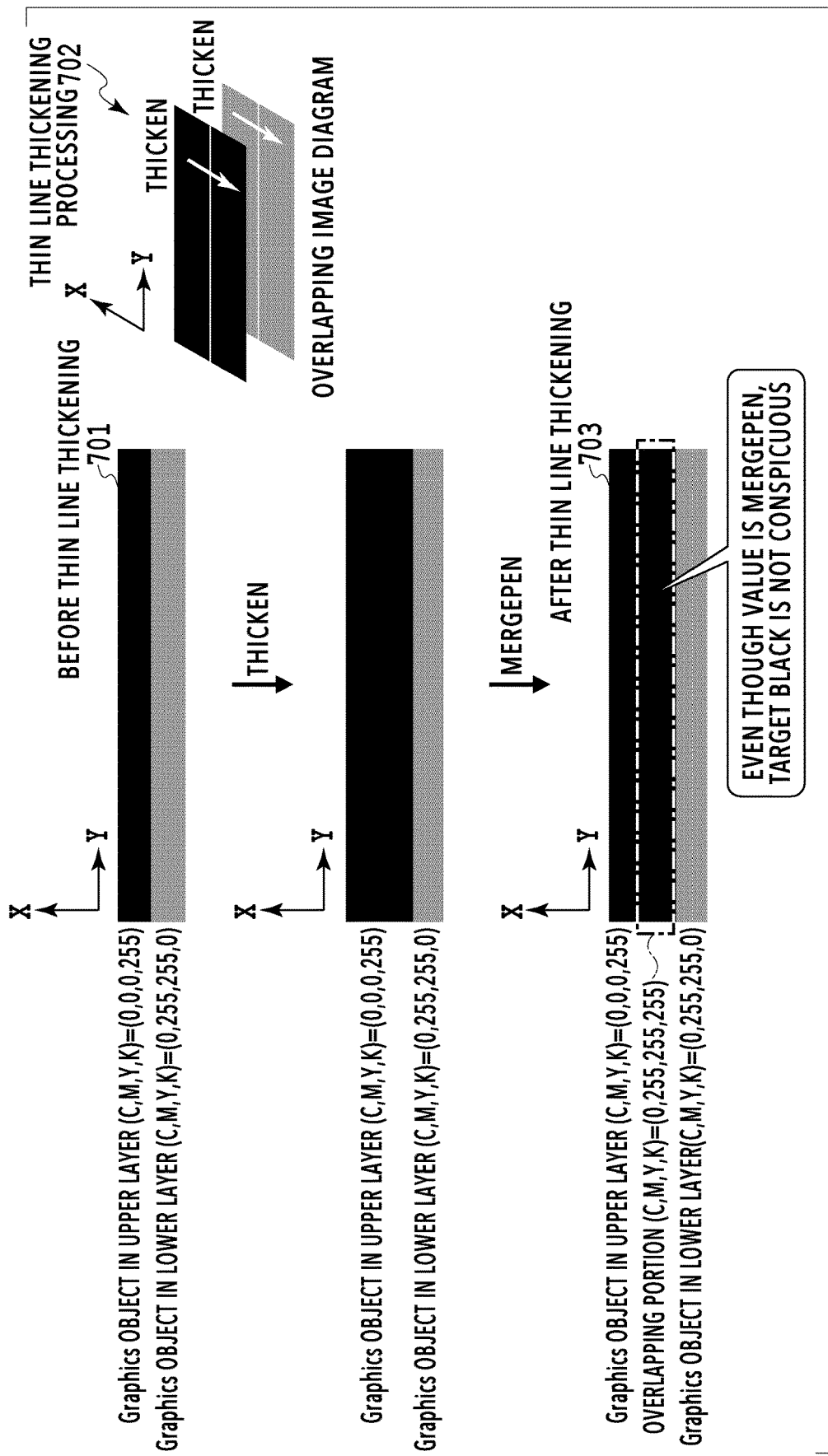
FIG. 7 is a diagram showing an example of thin line thickening processing in a case where black over print is valid and a pure black function has been applied to a black color.

In the following, by using FIG. 7, an example of the thin line thickening processing in a case where the black over print is valid and the pure black function has been applied to a black color is explained.

The pure black function is a function that performs processing by assuming "C=M=Y=0, K=255" in a case where "R=G=B=0", "C=M=Y=255", or "C=M=Y=0 and K is an arbitrary value".

Symbol 701 indicates an example in which a black line whose width in the longitudinal direction (X-direction) is one pixel and which is in the upper layer and a red line whose width is one pixel and which is in the lower layer extend respectively along the horizontal direction (Y-direction) and the black line and the red line are arranged one on top of another in the longitudinal direction (X-direction). In a case where the pure black function is valid, the color values of the black line in the upper layer are C=M=Y=0 and K=255. As explained by using FIG. 6, in a case where the black over print is valid, the code value of the ROP code is changed from COPYPEN to MERGEPEN, and therefore, normally the black line is not the target of the thin line thickening processing. However, in a case where the thin line in the upper layer and the thin line in the lower layer, which are indicated by symbol 701, are thickened by one pixel each in the −X-direction as indicated by symbol 702 by the thin line thickening processing, as indicated by symbol 703, an overlap occurs at the thickened portion of the thickened black line and the portion of the original red line. In a case where the ROP computing by MERGEPEN is performed for the black line in the upper layer and the red line in the lower layer as described above, the overlap portion becomes a black line as well. Consequently, it does not occur that the contour is seen as a line as explained in FIG. 5.

Figure 8:
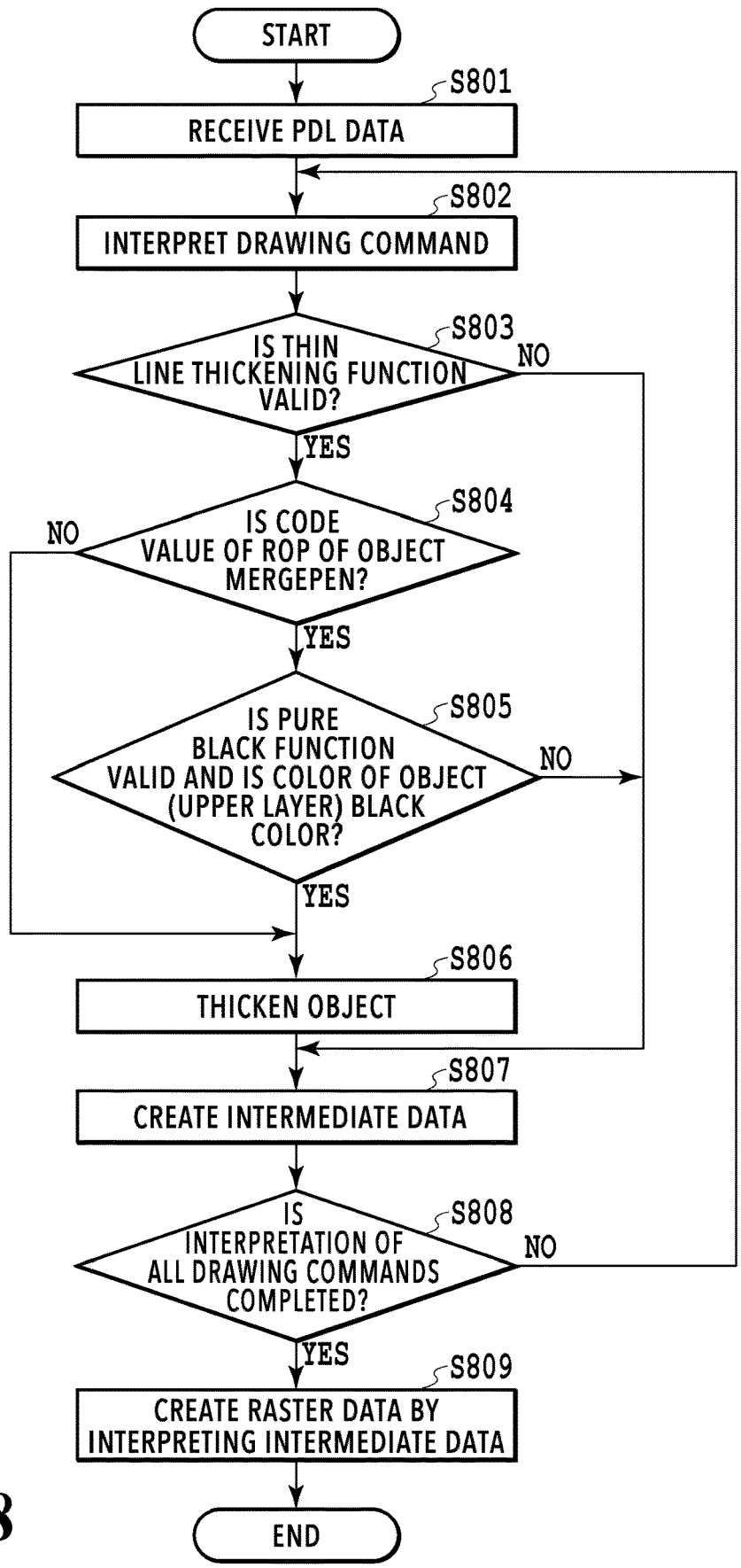
FIG. 8 is a flowchart of thin line thickening processing in a first embodiment.

Next, by using FIG. 8, the flow of the thin line thickening processing in a case where the black over print is valid and the pure black function has been applied to a black color in the present embodiment is explained. The processing shown in FIG. 8 is performed by a program stored in the ROM 202 being loaded onto the RAM 203 and the CPU 201 executing the loaded program.

At step S801, the image forming apparatus 100 receives PDL data transmitted by the PC 110 and the CPU 201 stores the received PDL data in the RAM 203. In the following, "step S-" is abbreviated to "S-".

At S802, the CPU 201 obtains the PDL data stored at S801 and interprets the drawing command included in the obtained PDL data.

At S803, the CPU 201 determines whether the thin line thickening function is valid by using the setting value relating to the thin line thickening function in the image forming apparatus 100 and the setting information included in the PDL data obtained at S802. In the present embodiment, in a case where at least one of the setting value relating to the thin line thickening function, which is stored in the RAM 203 of the image forming apparatus 100, and the setting information included in the PDL data obtained at S802 indicates that the thin line thickening function is valid, the CPU 201 determines that the thin line thickening function is valid. That is, in a case where both the setting value relating to the thin line thickening function and the setting information included in the PDL data indicate that the thin line thickening function is invalid, the CPU 201 determines that the thin line thickening function is invalid. In a case where determination results at this step are affirmative, the processing advances to S804 and on the other hand, in a case where the determination results are negative, the processing advances to S807.

At S804, the CPU 201 determines whether the code value of the ROP code corresponding to the object being interpreted is MERGEPEN. In a case where determination results at this step are affirmative, the processing advances to S805 and on the other hand, in a case where the determination results are negative, the processing advances to S806.

At S805, the CPU 201 determines whether the pure black function is valid and the color of the object in the upper layer of the object being interpreted is the black color to which the pure black function has been applied. For the determination at this step, the setting value relating to the pure black function in the image forming apparatus 100 and the setting information included in the PDL data obtained at S802 are used. Specifically, in a case where at least one of the setting value relating to the pure black function, which is stored in the RAM 203 of the image forming apparatus 100, and the setting information included in the PDL data obtained at S802 indicates that the pure black function is valid, the CPU 201 determines that the pure black function is valid. That is, in a case where both the setting value relating to the pure black function and the setting information included in the PDL data indicate that the pure block function is invalid, the CPU 201 determines that the pure black function is invalid. In a case where determination results at this step are affirmative, the processing advances to S806. On the hand, in a case where the determination results at this step are negative, the processing advances to S807 without performing the thickening processing for the object being interpreted.

At S806, the CPU 201 performs the thickening processing for the object being interpreted. As shown at S804 to S806, the CPU 201 functions as a control unit configured to control whether or not to perform the thickening processing to thicken the object in the upper layer and the object in the lower layer based on the ROP code.

At S807, the CPU 201 creates intermediate data of the object being interpreted.

At S808, the CPU 201 determines whether the interpretation of all the drawing commands included in the PDL data obtained at S802 is completed. In a case where determination results at this step are affirmative, the processing advances to S809 and on the other hand, in a case where the determination results are negative, the processing returns to S802.

At S809, the CPU 201 creates image data in the raster format (so-called raster data) by interpreting the intermediate data created at S807.

The above is the contents of the thin line thickening processing in a case where the black over print is valid and the pure black function has been applied to the black color.

Second Embodiment

In the first embodiment, the thin line thickening processing in a case where the black over print is valid and the pure black function has been applied to the black color is explained. In the present embodiment, the thin line thickening processing in a case where the black over print is valid and the pure black function has not been applied to the black color is explained. The hardware configuration of the image forming apparatus in the present embodiment is the same as that of the first embodiment, and therefore, explanation is omitted. In the following, portions different between the present embodiment and the first embodiment are explained mainly.

Figure 9:
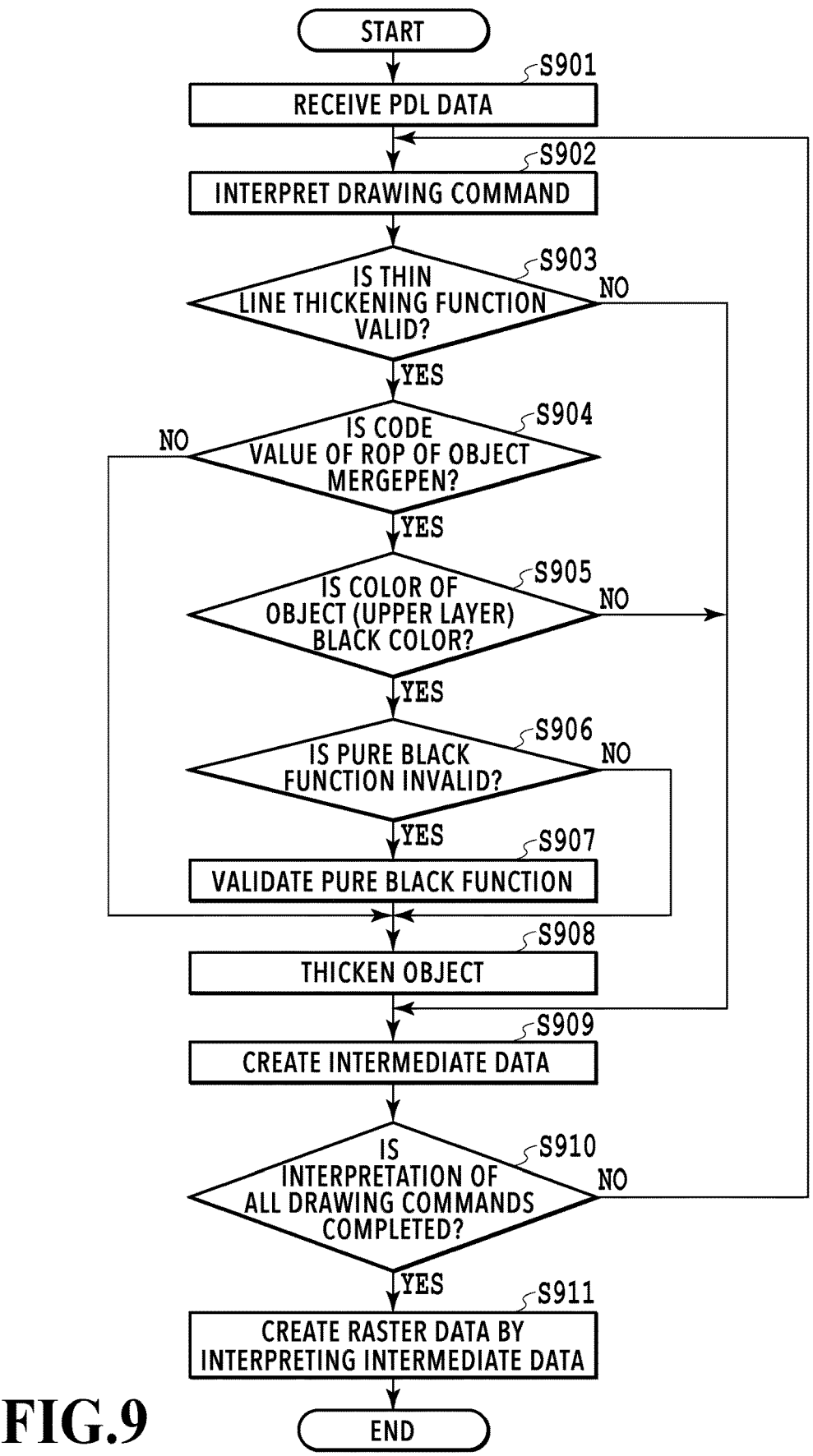
FIG. 9 is a flowchart of thin line thickening processing in a second embodiment.

In the following, by using FIG. 9, the flow of the thin line thickening processing in a case where the black over print is valid and the pure black function has not been applied to the black color is explained. The processing shown in FIG. 9 is performed by a program stored in the ROM 202 being loaded onto the RAM 203 and the CPU 201 executing the loaded program.

At S901, the image forming apparatus 100 receives PDL data transmitted by the PC 110 and the CPU 201 stores the received PDL data in the RAM 203.

At S902, the CPU 201 obtains the PDL data stored at S901 and interprets the drawing command included in the obtained PDL data.

At S903, the CPU 201 determines whether the thin line thickening processing is valid by using the setting value relating to the thin line thickening function in the image forming apparatus 100 and the setting information included in the PDL data obtained at S902. In the present embodiment, at least one of the setting value relating to the thin line thickening function, which is stored in the RAM 203 of the image forming apparatus 100, and the setting information included in the PDL data obtained at S902 indicates that the thin line thickening function is valid, the CPU 201 determines that the thin line thickening function is valid. That is, in a case where both the setting value relating to the thin line thickening function and the setting information included in the PDL data indicate that the thin line thickening function is invalid, the CPU 201 determines that the thin line thickening function is invalid. In a case where determination results at this step are affirmative, the processing advances to S904 and on the other hand, in a case where the determination results are negative, the processing advances to S909.

At S904, the CPU 201 determines whether the code value of the ROP code corresponding to the object being interpreted is MERGEPEN. In a case where determination results at this step are affirmative, the processing advances to S905 and on the other hand, in a case where the determination results are negative, the processing advances to S908.

At S905, the CPU 201 determines whether the color of the object in the upper layer of the object being interpreted is a black color. In a case where determination results at this step are affirmative, the processing advances to S906 and on the other hand, in a case where the determination results are negative, the processing advances to S909 without performing the thickening processing for the object being interpreted.

At S906, the CPU 201 determines whether the pure black function is invalid. For the determination at this step, the setting value relating to the pure black function in the image forming apparatus 100 and the setting information included in the PDL data obtained at S902 are used. Specifically, in a case where at least one of the setting value relating to the pure black function, which is stored in the RAM 203 of the image forming apparatus 100, and the setting information included in the PDL data obtained at S902 indicates that the pure black function is valid, the CPU 201 determines that the pure black function is valid. That is, in a case where both the setting value relating to the pure black function and the setting information included in the PDL data indicate that the pure black function is invalid, the CPU 201 determines that the pure black function is invalid. In a case where determination results at this step are affirmative, the processing advances to S907 and on the other hand, in a case where the determination results are negative, the processing advances to S908.

At S907, the CPU 201 validates the setting of the pure black function in the image forming apparatus 100. At this step, the CPU 201 functions as a validation unit configured to validate the setting of the pure black function.

At S908, the CPU 201 performs the thickening processing for the object being interpreted. As shown at S904 to S908, the CPU 201 functions as a control unit configured to control whether or not to perform the thickening processing to thicken the object in the upper layer and the object in the lower object based on the ROP code.

At S909, the CPU 201 creates intermediate data of the object being interpreted.

At S910, the CPU 201 determines whether the interpretation of all the drawing commands included in the PDL data obtained at S902 is completed. In a case where determination results at this step are affirmative, the processing advances to S911 and on the other hand, in a case where the determination results are negative, the processing returns to S902.

At S911, the CPU 201 creates raster data by interpreting the intermediate data created at S909.

The above is the contents relating to the thin line thickening processing in a case where the black over print is valid and the pure black function has not been applied to the black color.

Third Embodiment

In the first embodiment, the thin line thickening processing in a case where the black over print is valid and the pure black function has been applied to the black color is explained. In the second embodiment, the thin line thickening processing in a case where the black over print is valid and the pure black function has not been applied to the black color is explained. In the present embodiment, the thin line thickening processing in a case where composite over print is valid and the pure black function has been applied to the black color is explained. The hardware configuration of the image forming apparatus in the present embodiment is the same as that of the embodiments described previously, and therefore, explanation is omitted.

<Difference between Black over Print and Composite over Print>

In the black over print, at the time of drawing black on the foreground in an overlapping manner by leaving the color of the background, MERGEPEN is used in the ROP computing. In contrast to this, in the processing called composite over print for representing transparency, even in a case where the color of the foreground is not black, MERGEPEN is used in the ROP computing.

<Thin Line Thickening Processing in a Case where Composite over Print is Valid>

In overlapping of objects in a case where the composite over print is valid, MERGEPEN is used irrespective of the color of the line. Because of this, in a case where the thin line thickening processing is performed in a situation where the composite over print is valid, there is a possibility that such a problem that an intended line is seen occurs, which is described in the first embodiment.

<Thin Line Thickening Processing in a Case where Composite Pver Print is Valid and Pure Black Function has been applied to Black Color>

Figure 10:
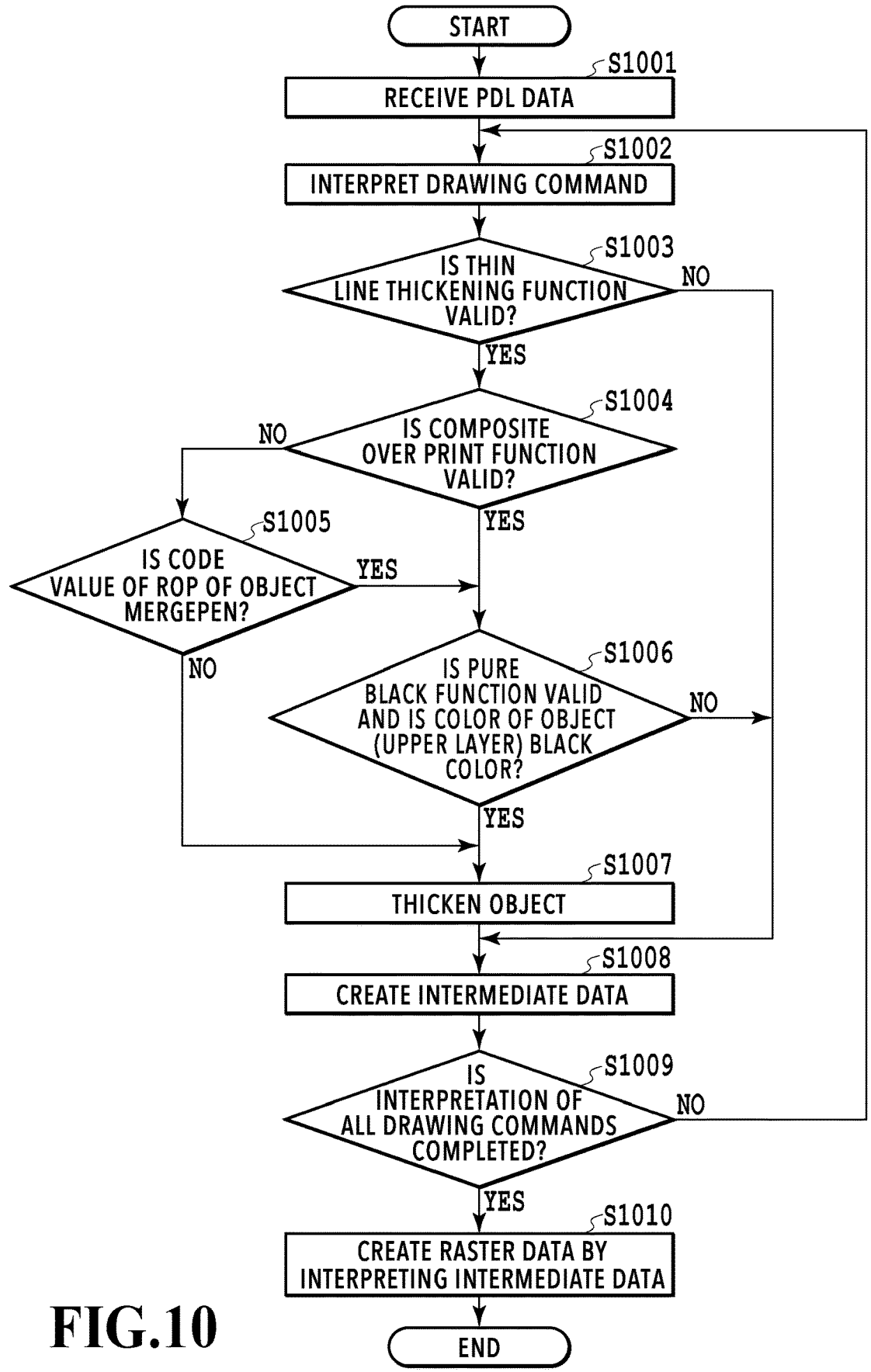
FIG. 10 is a flowchart of thin line thickening processing in a third embodiment.

Next, by using FIG. 10, the flow of the thin line thickening processing in a case where the composite over print is valid and the pure black function has been applied to the black color in the present embodiment is explained. The processing shown in FIG. 10 is performed by a program stored in the ROM 202 being loaded onto the RAM 203 and the CPU 201 executing the loaded program.

At S1001, the image forming apparatus 100 receives PDL data transmitted by the PC 110 and the CPU 201 stores the received PDL data in the RAM 203.

At S1002, the CPU 201 obtains the PDL data stored at S1001 and interprets the drawing command included in the obtained PDL data.

At S1003, the CPU 201 determines whether the thin line thickening function is valid by using the setting value relating to the thin line thickening function in the image forming apparatus 100 and the setting information included in the PDL data obtained at S1002. In the present embodiment, in a case where at least one of the setting value relating to the thin line thickening function, which is stored in the RAM 203 of the image forming apparatus 100, and the setting information included in the PDL data obtained at S1002 indicates that the thin line thickening function is valid, the CPU 201 determines that the thin line thickening function is valid. That is, in a case where both the setting value relating to the thin line thickening function and the setting information included in the PDL data indicate that the thin line thickening function is invalid, the CPU 201 determines that the thin line thickening function is invalid. In a case where determination results at this step are affirmative, the processing advances to S1004 and on the other hand, in a case where the determination results are negative, the processing advances to S1008.

At S1004, the CPU 201 determines whether the composite over print function is valid by using the setting value relating to the composite over print function in the image forming apparatus 100 and the setting information included in the PDL data obtained at S1002. In the present embodiment, the determination is performed by using the setting value relating to the composite over print function, which is stored in the RAM 203 of the image forming apparatus 100, and the setting information included in the PDL data obtained at S1002. Specifically, in a case where at least one of the setting value and the setting information indicates that the composite over print function is valid, the CPU 201 determines that the composite over print function is valid. That is, in a case where both the setting value relating to the composite over print function and the setting information included in the PDL data indicate that the composite over print function is invalid, the CPU 201 determines that the composite over print is invalid. In a case where determination results at this step are affirmative, the processing advances to S1006 and on the other hand, in a case where the determination results are negative, the processing advances to S1005.

At S1005, the CPU 201 determines whether the code value of the ROP code corresponding to the object being interpreted is MERGEPEN. In a case where determination results at this step are affirmative, the processing advances to S1006 and on the other hand, in a case where the determination results are negative, the processing advances to S1007.

At S1006, the CPU 201 determines whether the pure black function is valid and the color of the object in the upper layer of the object being interpreted is the black color to which the pure black function has been applied. For the determination at this step, the setting value relating to the pure black function in the image forming apparatus 100 and the setting information included in the PDL data obtained at S1002 are used. Specifically, in a case where at least one of the setting value relating to the pure black function, which is stored in the RAM 203 of the image forming apparatus 100, and the setting information included in the PDL data obtained at S1002 indicates that the pure black function is valid, the CPU 201 determines that the pure black function is valid. That is, in a case where both the setting value relating to the pure black function and the setting information included in the PDL data indicate that the pure black function is invalid, the CPU 201 determines that the pure black function is invalid. In a case where determination results at this step are affirmative, the processing advances to S1007. On the other hand, in a case where the determination results at this step are negative, the processing advances to S1008 without performing the thickening processing for the object being interpreted.

At S1007, the CPU 201 performs the thickening processing for the object being interpreted. As shown at S1004 to S1006, the CPU 201 functions as a control unit configured to control whether or not to perform the thickening processing to thicken the object in the upper layer and the object in the lower layer based on the ROP code.

At S1008, the CPU 201 creates intermediate data of the object being interpreted.

At S1009, the CPU 201 determines whether the interpretation of all the drawing commands included in the PDL data obtained at S1002 is completed. In a case where determination results at this step are affirmative, the processing advances to S1011 and on the other hand, in a case where the determination results are negative, the processing returns to S1002.

At S1010, the CPU 201 creates image data in the raster format (so-called raster data) by interpreting the intermediate data created at S1009.

The above is the contents relating to the thin line thickening processing in a case where the composite over print is valid and the pure black function has been applied to the black color.

Other Embodiments

As above, various embodiments are described in detail, but it may also be possible to apply the contents of the present disclosure to a system including a plurality of devices or to an apparatus including one device. As the apparatus such as this, for example, there are a scanner, a printer, a PC, a copy machine, a multifunction peripheral, and a facsimile device.

It is also possible to implement the contents of the present disclosure by directly or remotely supplying a software program implementing each function of the embodiments described previously to a system or an apparatus and by a computer included in the system and the like reading and executing the supplied program code.

Consequently, the program code itself installed in a computer in order to implement the functions and processing of the present disclosure by the computer also implements the contents of the present disclosure. That is, the computer program itself for implementing the functions and processing described previously is also one embodiment of the present disclosure.

In that case, the program aspect may be any one as long as the aspect has the function of the program, such as an object code, a program executed by an interpreter, and script data to be supplied to the OS.

As the storage medium for supplying the program, there are, for example, a flexible disk, a hard disk, an optical disk, a magnet-optical disk, MO, CD-ROM, CD-R, CD-RW and the like. Further, as the storage medium, there are also a magnetic tape, a nonvolatile memory card, ROM, DVD (DVD-ROM, DVD-R) and the like.

Further, it may also be possible to download the program from a website of the internet/intranet by using a browser of a client computer. That is, it may also be possible to download the computer program itself of the present disclosure or a file compressed and including the automatic installation function to the storage medium, such as a hard disk, from the website such as this.

Further, it is also possible to implement the present disclosure by dividing the program code configuring the program of the present disclosure into a plurality of files and downloading each file from different websites. That is, there is a case where a WWW server allowing a plurality of users to download the program file for implementing the functions and processing of the present disclosure by a computer forms the configuration requirement of the present disclosure.

Further, it may also be possible to encrypt the program of the present disclosure and store it in a storage medium, such as a CD-ROM, and distribute it to a user. In this case, it may also be possible to allow only a user having cleared a predetermined condition to download key information for decryption from a website via the internet/intranet, decode the encrypted program with the key information and execute the program, and install the program in a computer.

It may also be possible to implement the functions of the embodiments described previously by a computer executing the read program. It may also be possible for the OS or the like running on a computer to perform part or all of the actual processing based on the instructions of the program. Of course, in this case also, the functions of the embodiments described previously may be implemented.

Further, it may also be possible for the program read from a storage medium to be written to a memory provided on a function extension board inserted into a computer or a function extension unit connected to a computer. It may also be possible for a CPU or the like provided on the function extension board or the function extension unit to perform part of all of the actual processing based on the instructions of the program. There is a case where the functions of the embodiments described previously are implemented in this manner.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, it is possible to provide a mechanism capable of performing thickening processing of an object irrespective of the color of a line even in a case where the black over print is valid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-000189, filed Jan. 4, 2021, which is hereby incorporated by reference wherein in its entirety.

What is claimed is:

1. An image forming apparatus comprising:
a control unit configured to control whether or not to perform thickening processing to thicken an object in an upper layer and an object in a lower layer in image data included in a print job based on a raster operation code designating drawing processing in a case where the object in the upper layer and the object in the lower layer overlap, wherein
the control unit:
does not perform the thickening processing in a case where a value of the raster operation code is MERGEPEN and a color of the object in the upper layer is not a black color; and
performs the thickening processing in a case where the value is MERGEPEN, the color of the object in the upper layer is a black color, and a pure black function is applied to the black color.

2. The image forming apparatus according to claim 1, further comprising:
a reception unit configured to receive the print job; and
an interpretation unit configured to interpret a drawing command included in PDL data obtained as the print job.

3. The image forming apparatus according to claim 2, further comprising:
a first determination unit configured to determine whether a thickening function to thicken an object is valid by using setting information included in the PDL data and a setting value stored in the image forming apparatus; and
a second determination unit configured to determine whether the value is MERGEPEN.

4. The image forming apparatus according to claim 3, further comprising:
a third determination unit configured to determine whether the pure black function is valid and the color of the object in the upper layer is a black color in a case where determination results by the first determination unit are affirmative and determination results by the second determination unit are affirmative.

5. The image forming apparatus according to claim 4, wherein
the control unit performs the thickening processing in a case where determination results by the third determination unit are affirmative.

6. The image forming apparatus according to claim 3, further comprising:
a third determination unit configured to determine whether the color of the object in the upper layer is a black color in a case where determination results by the first determination unit are affirmative and determination results by the second determination unit are affirmative; and
a fourth determination unit configured to determine whether the pure black function is invalid in a case where determination results by the third determination unit are affirmative.

7. The image forming apparatus according to claim 6, further comprising:
a validation unit configured to validate the pure black function in a case where determination results by the fourth determination unit are affirmative.

8. The image forming apparatus according to claim 7, wherein
the control unit performs the thickening processing in a case where determination results by the third determination unit are negative or in a case where the pure black function has been validated by the validation unit.

9. The image forming apparatus according to claim 2, further comprising:
a creation unit configured to create intermediate data of the object in the upper layer and the object in the lower layer.

10. The image forming apparatus according to claim 2, further comprising:
a determination unit configured to determine whether all drawing commands included in the PDL data have been interpreted.

11. The image forming apparatus according to claim 9, further comprising:
a creation unit configured to create raster data by interpreting the intermediate data.

12. The image forming apparatus according to claim 1, wherein
the object in the upper layer and the object in the lower layer are each a thin line.

13. The image forming apparatus according to claim 2, further comprising:
a first determination unit configured to determine whether a thickening function to thicken an object is valid by using setting information included in the PDL data and a setting value stored in the image forming apparatus;
a second determination unit configured to determine whether a composite over print function is valid; and
a third determination unit configured to determine whether the value is MERGEPEN.

14. An image forming method that is performed by an image forming apparatus comprising a control unit configured to control whether or not to perform thickening processing to thicken an object in an upper layer and an object in a lower layer in image data included in a print job based on a raster operation code designating drawing processing in a case where the object in the upper layer and the object in the lower layer overlap, wherein
the control unit:
does not perform the thickening processing in a case where a value of the raster operation code is MERGEPEN and a color of the object in the upper layer is not a black color; and
performs the thickening processing in a case where the value is MERGEPEN, the color of the object in the upper layer is a black color, and a pure black function is applied to the black color.

15. A non-transitory computer readable storage medium storing a program for causing a computer to perform an image forming method that is performed by an image forming apparatus comprising a control unit configured to control whether or not to perform thickening processing to thicken an object in an upper layer and an object in a lower layer in image data included in a print job based on a raster operation code designating drawing processing in a case where the object in the upper layer and the object in the lower layer overlap, wherein the control unit:
: does not perform the thickening processing in a case where a value of the raster operation code is MERGEPEN and a color of the object in the upper layer is not a black color; and
: performs the thickening processing in a case where the value is MERGEPEN, the color of the object in the upper layer is a black color, and a pure black function is applied to the black color.

* * * * *